United States Patent [19]

Takakado et al.

[11] Patent Number: 5,237,260

[45] Date of Patent: Aug. 17, 1993

[54] ENGINE-OPERATED GENERATOR SYSTEM

[75] Inventors: Yuzo Takakado; Hirohiko Murata; Takumi Yoshida, all of Toyohashi; Hirotaka Kumakura, Yokohama, all of Japan

[73] Assignees: Shinko Electric Co., Ltd.; Nissan Motor Co., Ltd., both of Japan

[21] Appl. No.: 791,181

[22] Filed: Nov. 13, 1991

[30] Foreign Application Priority Data

Nov. 30, 1990 [JP] Japan .................................. 2-337331

[51] Int. Cl.⁵ ............................................ F02N 11/04
[52] U.S. Cl. ...................................... 322/10; 322/32; 363/126
[58] Field of Search ................... 322/9, 10, 11, 29, 32; 363/84, 85, 89, 126, 127; 290/46 R

[56] References Cited

U.S. PATENT DOCUMENTS

| | | | |
|---|---|---|---|
| 4,119,861 | 10/1978 | Gocho | 322/32 X |
| 4,193,111 | 3/1980 | Wester | 363/84 |
| 4,330,743 | 5/1978 | Glennon | 322/10 |
| 4,607,246 | 8/1986 | Wada et al. | 322/25 X |
| 4,634,955 | 11/1987 | Wada | 322/99 |
| 4,750,102 | 7/1988 | Yamano et al. | 363/142 |
| 4,786,852 | 11/1988 | Cook | 322/10 |
| 4,841,216 | 6/1989 | Okada et al. | 322/10 |
| 4,992,920 | 2/1991 | Davis | 322/32 X |
| 5,065,086 | 11/1991 | Takakado | 322/10 |

FOREIGN PATENT DOCUMENTS 0338512 10/1989 European Pat. Off. .
2608858 6/1988 France .

OTHER PUBLICATIONS

Abstract of Japanese Published Patent Application, No. 83-29075, Patent Abstract of Japan, 1985 (Publication No. 59153955).

C. Cyr, K. Al-Haddad, "Control Strategy and Topological Study of a Novel Single Phase Regenerative AC/DC Converter Feeding a DC Servo Motor", Oct. 1989, vol. 2, EPE'89, pp. 789-794.

Primary Examiner—Steven L. Stephan
Assistant Examiner—Kristine Peckman
Attorney, Agent, or Firm—Bacon & Thomas

[57] ABSTRACT

An engine-operated generator system utilizes the switching elements of an inverter transformation circuit to accomplish starting. The starter circuit includes a battery, one electrode of which is connected to one terminal of a smoothing capacitor connected between the DC terminals of the inverter transformation circuit in such a manner that the electrode and the terminal are of the same polarity. The other electrode is connected to one of the output terminals of an AC generator system through a switch which is closed to start the engine, and which is connected to a reactor forming an LC circuit. In starting the engine, the rectifier circuit is driven in an inverter transformation mode, one of the switching elements in the inverter transformation circuit which is connected between the reactor and the one terminal of the smoothing capacitor being driven in a chopper mode. The inverter transformation circuit is formed by bridge-connecting switching elements each having a flywheel diode. The same starting circuit may be used in connection with a DC generator, with or without the inclusion of a smoothing capacitor at the output of the DC generator.

5 Claims, 7 Drawing Sheets

ENGINE-OPERATED GENERATOR SYSTEM

BACKGROUND OF THE INVENTION

1. Field of the Invention

This invention relates to engine-operated generator systems, and more particularly to an engine-operated generator system in which the generator is driven as an engine starter.

2. Description of Related Art

FIG. 8 shows a main circuit and a starting control power source circuit in a conventional engine-operated generator system. The conventional engine-operated generator includes a three-phase AC generator AG driven by an engine EG; a rectifier circuit 1 having an inverter transformation function; an inverter transformation circuit 2; a smoothing electrolytic capacitor CD; a starting control power source circuit 4; and a control circuit 5 for controlling main circuit and the starting control power source circuit 4; a DC positive bus P of the main circuit; and a DC negative bus N of the main circuit.

Rectifier circuit 1 includes bridge-connected transistors QR1–QR6 each having a reverse conducting diode D1 and base electrodes b1 connected to receive control pulses S1 from circuit 5. When AC generator AG is driven by the engine EG for power generation, the six diodes D1, which together form a three-phase full-wave rectifier circuit, rectify the three-phase outputs of the AC generator AG into DC outputs.

The inverter transformation circuit 2 is made up of bridge-connected transistors QI1–QI4 each having a flywheel diode D2 and base electrodes b2 connected to receive control pulses S2 from circuit 5, thereby forming a pulse width modulation (PWM) system. The inverter transformation circuit 2 receives the control pulses S2 from control circuit 5 and converts the DC output into a single-phase AC signal when the AC generator AG is in operation. The single-phase AC power is outputted to AC terminals T01 and T02, where it is smoothed by an LC circuit made up of reactor Lo and capacitor Co.

The output thus smoothed is applied to a load (not shown) through output terminals T01 and T02 of the engine-operated generator system. When the AC generator AG is in operation, the six diodes D1, electrolytic capacitor CD, and inverter transformation circuit 2 form a voltage-control inverter.

The starting control power source circuit 4 includes a step up chopper circuit made up of a transistor QC, a reactor LCH, a diode DCH, and a battery BATT. In starting the generator system, the step up chopper circuit is driven by control circuit 5 to apply a predetermined DC voltage to the electrolytic capacitor CD. In this operation, the bridge circuit formed by transistor QR1–QR6 of the rectifier circuit 1 receives control pulses S1 from control circuit 5 and performs an inverter operation to convert the DC voltages into three-phase AC voltages, which are supplied to the AC generator AG. As a result, the AC generator AG carries out power generation to start engine EG. The step up chopper circuit performs this chopping operation until the speed of the engine EG reaches a predetermined value. When the speed of the engine EG reaches the predetermined value, the starting control power source circuit 4 stops its operation, while the inverter transformation circuit 2 starts the inverter transformation operation. Namely, in starting the generator system, the starting control power source circuit 4, the electrolytic capacitor CD, and the bridge circuit of the transistors QR1–QR6 form a voltage control inverter.

The structure of the conventional system is described in more detail.

When the transistor QC of the step up chopper circuit is rendered non-conductive (off) by control circuit 5, the step up chopper circuit is connected to the electrolytic capacitor CD and the battery BATT as shown in FIG. 9. Therefore, no current flows in the step up chopper circuit. When the transistor QC is rendered conductive (on) by a control pulse S3 provided by control circuit 5, the voltage E of the battery is applied across the reactor LCH, so that a current flows as shown in FIG. 10. When the transistor QC is rendered non-conductive (off) while the current is flowing, the current flows to start the electrolytic capacitor CD as shown in FIG. 11. The operation described with reference to FIG. 10 and 11 is repeatedly carried out in order to supply the energy of the battery BATT to the electrolytic capacitor CD.

The conventional system as described in connection with FIGS. 8–11 has the following disadvantages: as is apparent from the above description, the starting control power source circuit 4 is essential in order to start engine EG in the conventional engine-operated generator system. Accordingly, the number of components is high, and the system tends to have a rather intricate circuit arrangement and is unavoidably bulky. Furthermore, the DC positive bus of the main circuit is different in potential than the positive terminal of the battery BATT, and the DC negative bus is different in potential than the negative terminal of the battery, making it difficult to obtain a control voltage from the battery BATT with a common potential.

SUMMARY OF THE INVENTION

Accordingly, it is an objective of the invention to eliminate the above-described difficulties accompanying a conventional engine-operated generator system.

More specifically, it is an objective of the invention to provide an engine-operated generator system in which the above-described starting control power source circuit is eliminated so that, when compared with the conventional engine-operated generator system, the number of components is reduced and the arrangement of the circuit is simplified, resulting not only in a reduction of the manufacturing costs but also in miniaturization of the generator system.

These objectives of the invention are achieved by the provision of an engine-operated AC generator system of the above type in which the engine starting DC voltage source has one electrode which is connected to one terminal of the smoothing capacitor in such a manner that the one electrode and the one terminal are of the same polarity, and the other electrode of the DC voltage source is connected to one of the system output terminals via a switch which is connected to the reactor of an output LC filter circuit. In starting the engine, the rectifier circuit is driven in an inverter transformation mode, and one of the switching elements in the inverter transformation circuit which is connected between the reactor and the one terminal of the smoothing capacitor is driven in a chopper mode.

In an alternative preferred embodiment of an engine-operated generator system of the present invention, the generator is a DC generator, DC voltage source has one electrode connected to one of the generator output terminals such that the one electrode and the generator output terminals are of the same polarity, the other electrode of the DC voltage source is connected, via a switch which is closed to start the engine, to said one of the system output terminals which is connected to a reactor of the LC circuit, and one of the switching elements in the inverter transformation circuit is connected between the output LC filter reactor and one terminal of the DC generator and is driven in a chopper mode during starting.

In yet another aspect of a preferred invention, the engine-operated generator system includes a DC generator and a smoothing capacitor connected between the output terminals of the DC generator. In this embodiment, one of the switching elements in the inverter transformation circuit which is connected between the LC filter reactor and one terminal of the smoothing capacitor is driven in a chopper mode to start the engine.

By utilizing the LC output filter reactor and an inverter transformation circuit switching element, each of the preferred engine-driven generator system arrangements eliminates the discrete chopper circuit which is essential for the conventional engine-operated generator circuit. In addition, the electrodes of the voltage source in each of the embodiments are connected so as to be equal in potential to one of the negative and positive busses at the main power circuit of the engine-driven generator.

DETAILED DESCRIPTION OF THE PREFERRED EMBODIMENTS

Figure 1:
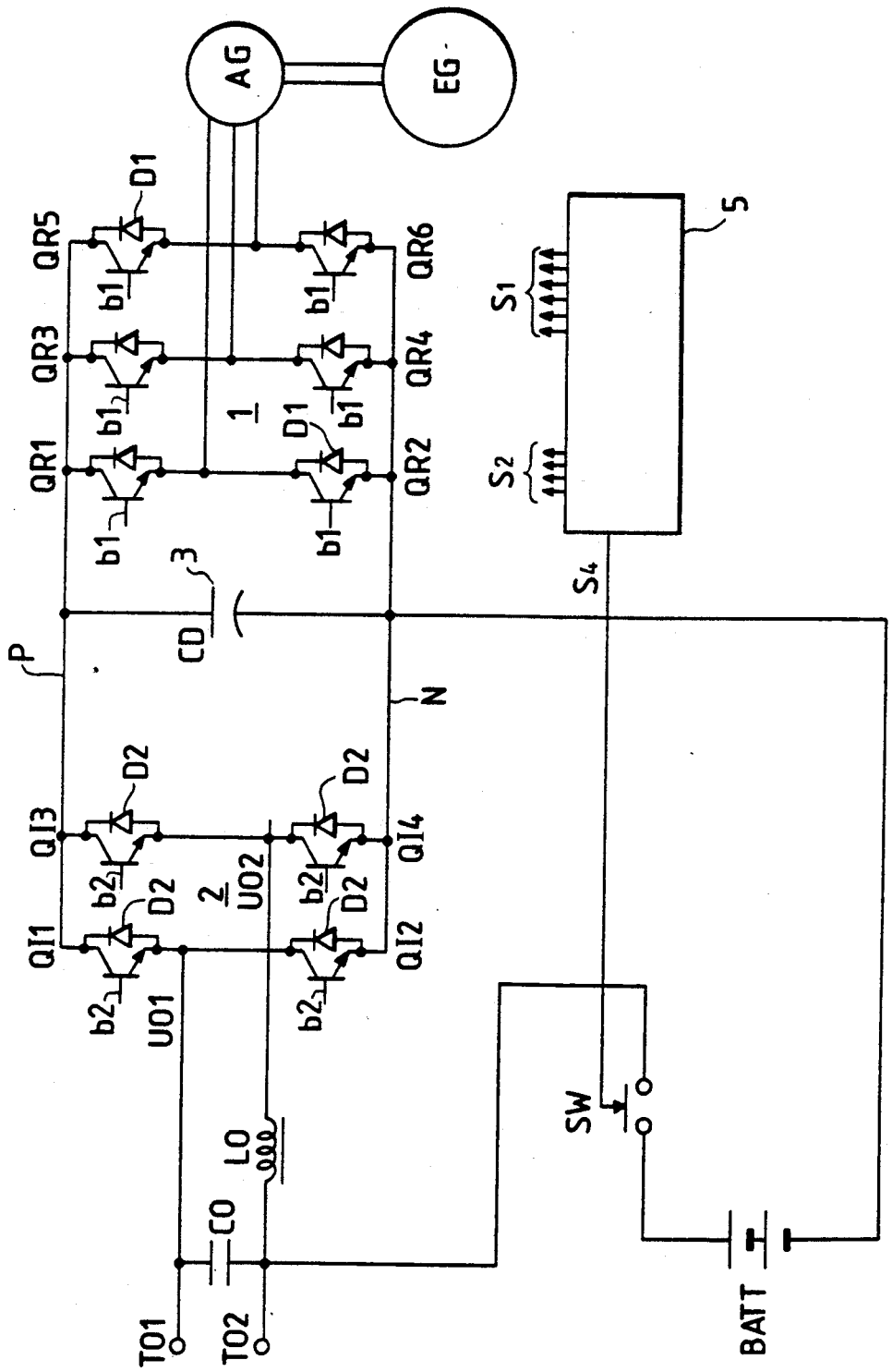
FIG. 1 is a schematic diagram of an engine-operated generator system according to a first preferred embodiment of the invention.

FIG. 1 shows an example of an engine-operated generator system according to the first preferred embodiment of the invention. In FIG. 1, reference character SW designates a switch. The positive terminal of a battery BATT is connected through the switch SW to one terminal of a reactor Lo, which is connected to a system output terminal T02. The negative terminal of battery BATT is connected to the negative terminal of an electrolytic capacitor CD. The switch SW is held turned-off when AC generator AG is in operation.

Figure 8:
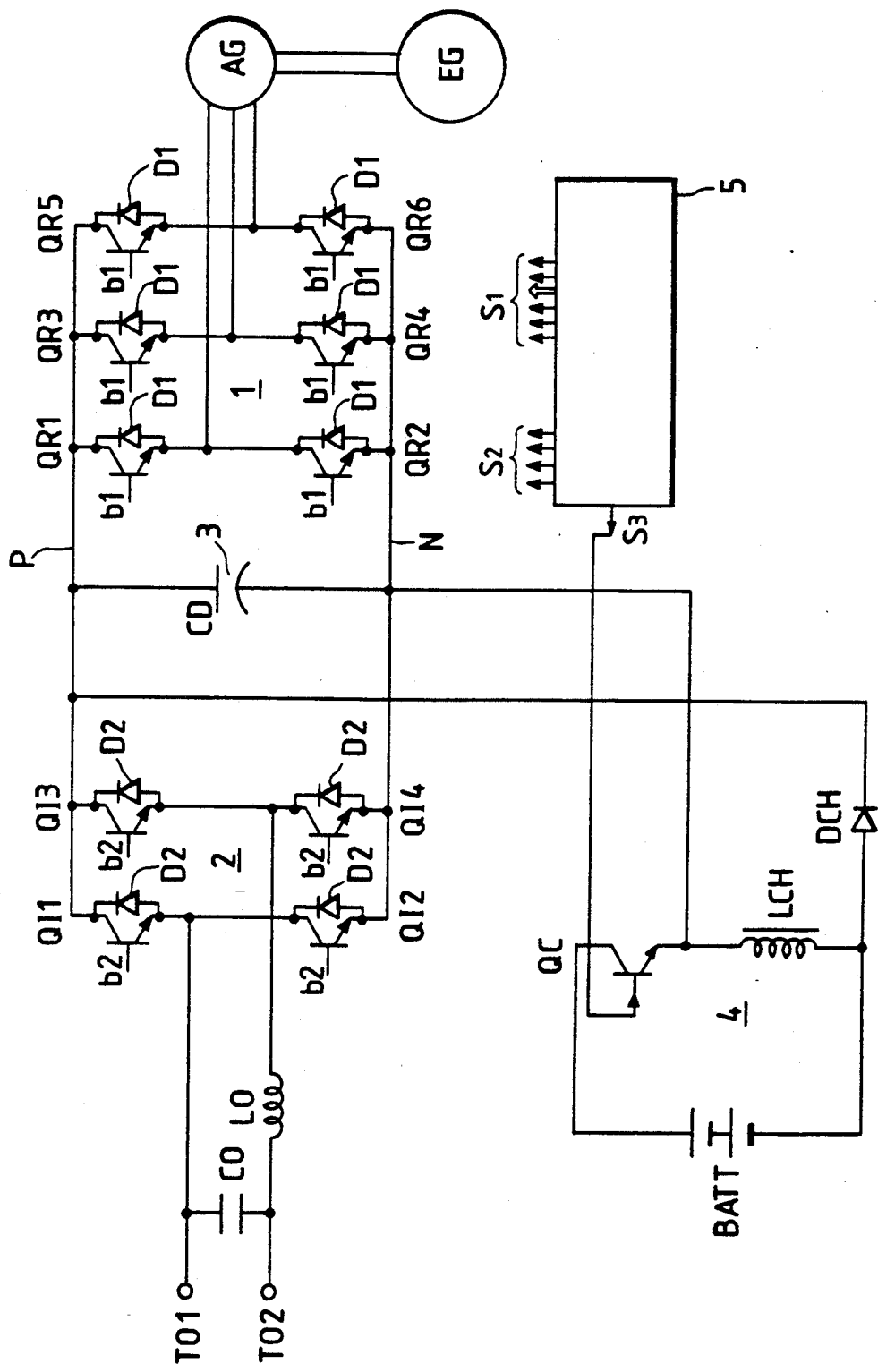
FIG. 8 is a circuit diagram showing the arrangement of a conventional engine-operated generator system.
Figure 9:
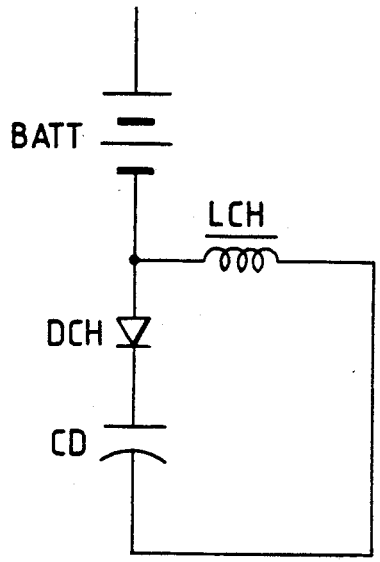
FIGS. 9-11 are circuit diagrams showing the operation of a step up chopper circuit in the conventional engine-operated generator system.
Figure 10:
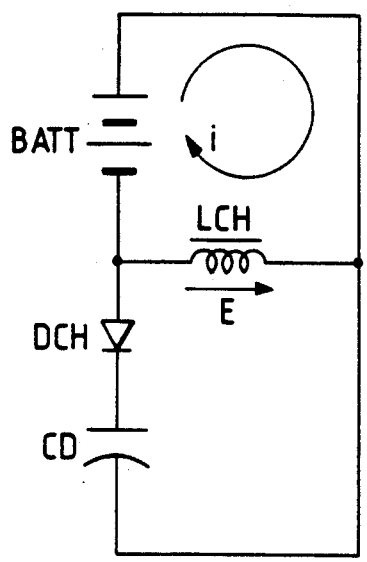
Figure 11:
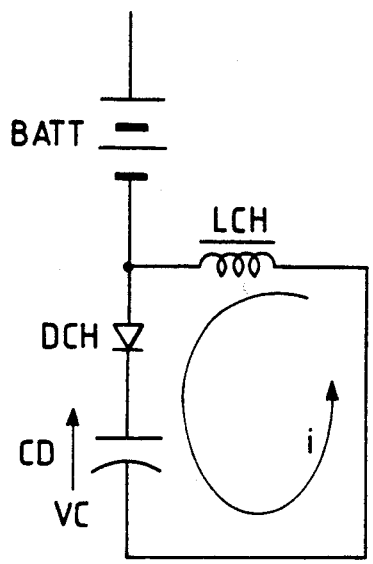

The preferred engine-operated generator system of FIG. 1, unlike the conventional engine-operated generator system shown in FIG. 8, has no step up chopper circuit. However, in the preferred engine-operated generator system, the remaining components other than those involved in starting are essentially the same as those in the conventional engine-operated generator system of FIG. 8, and thus common elements are designated by the same reference numerals or characters.

Figure 4:
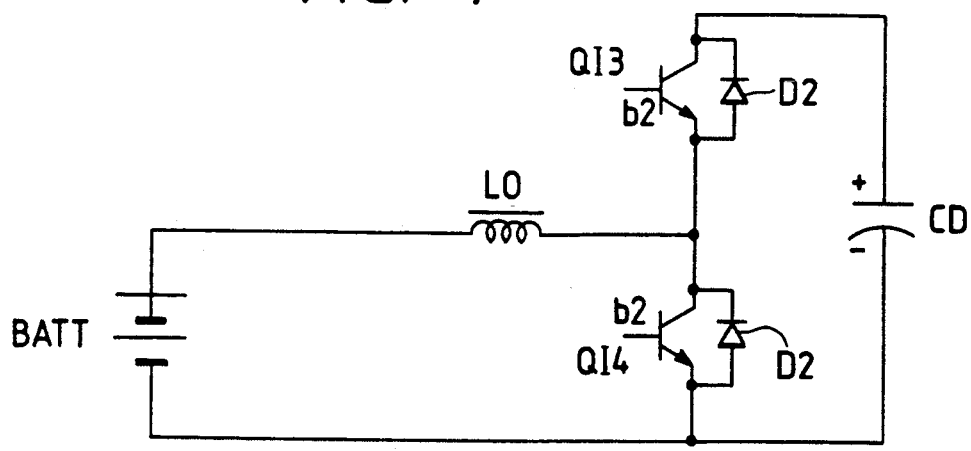
FIGS. 4-6 are schematic circuit diagrams showing the starting operation of the preferred engine-operated generator systems.

AC generator AG is driven as an engine starter as follows: before the start, all of the transistors QI1–QI4 in the inverter transformation circuit 2 are rendered non-conductive (off), and the switch SW is closed with an "on" instruction from control circuit 5. As a result, the battery BATT charges the electrolytic capacitor CD, with the polarity shown in FIG. 4, through the reactor L0 and the diode D2 connected to the transistor QI3, so that the terminal voltage of the electrolytic capacitor CD is raised to the voltage E of the battery BATT. After the electrolytic capacitor CD is initially charged in this manner, a step up chopper operation is carried out by turning on and off the transistor QI4 of the inverter transformation circuit 2.

The chopper operation is described in more detail hereinafter.

Figure 7:
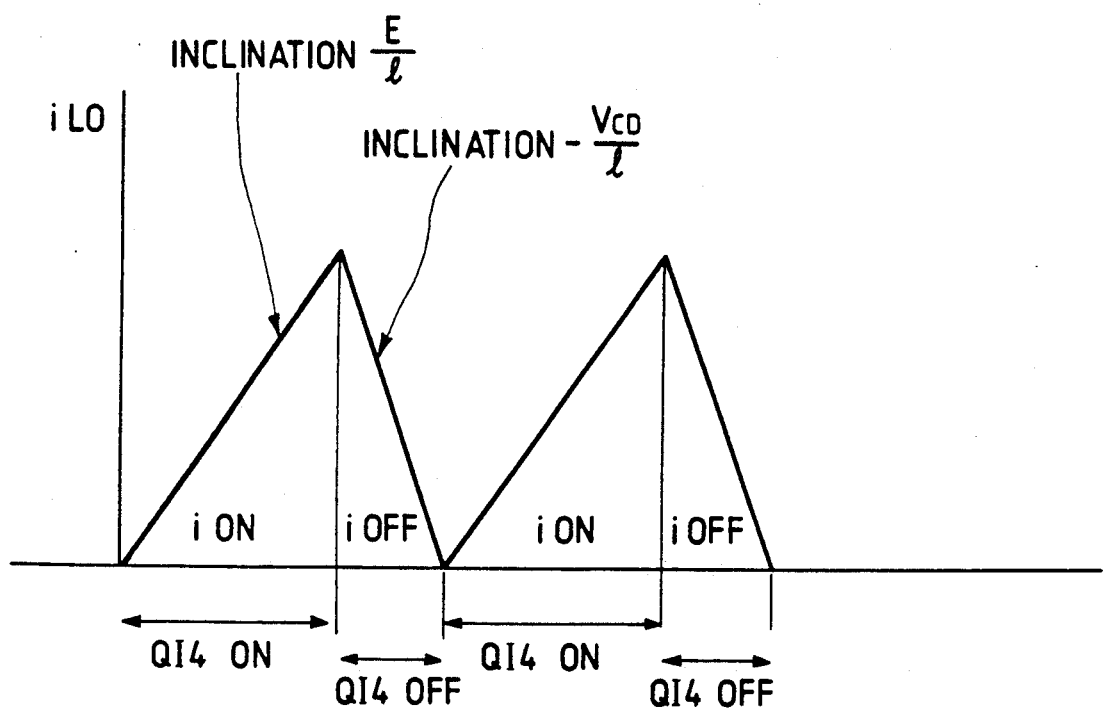
FIG. 7 is a diagram showing the waveform of a current flowing in a reactor of the preferred engine-operated generator system when the engine is started.

FIG. 7 shows the waveform of a current $i_{Lo}$ flowing in the reactor Lo. In FIG. 7, reference character "E" designates the voltage of the battery BATT, $V_{CD}$, the voltage of the electrolytic capacitor CD, and I the inductance of the reactor Lo.

Figure 5:
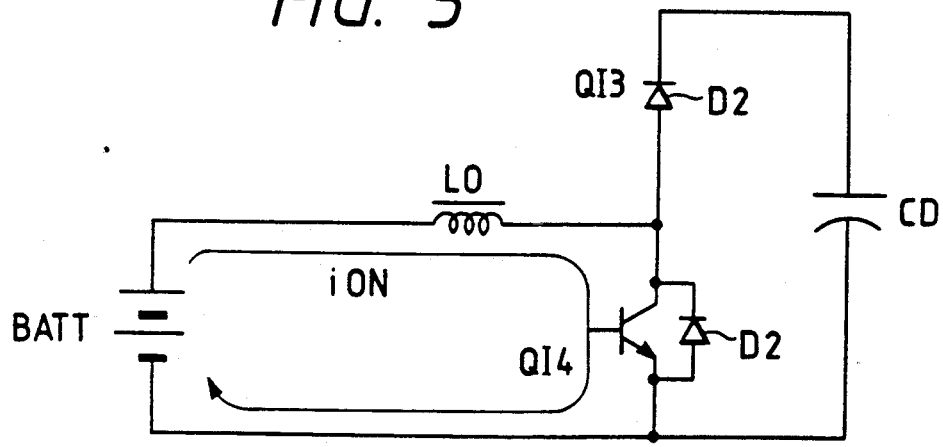
Figure 6:
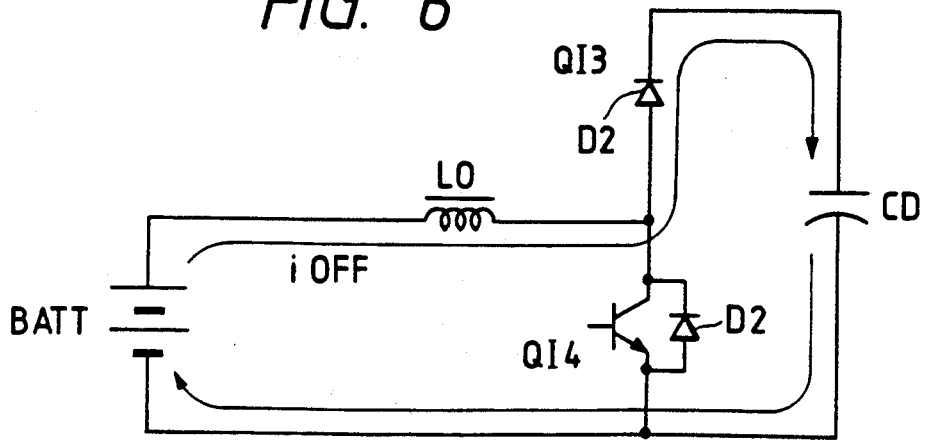

When the transistor QI4 is rendered conductive (on), current $i_{on}$ flows in the positive terminal of the battery BATT, reactor Lo, transistor QI4, and the negative terminal of the battery BATT, as shown in FIG. 5, so that energy is stored in the reactor Lo. When the transistor QI4 is thereafter rendered non-conductive (off), a current $i_{off}$, as shown in FIG. 6 flows in the positive terminal of the battery BATT, reactor Lo, reverse conducting diode D2 connected to the transistor QI3, electrolytic capacitor CD, and the negative terminal of the battery BATT in the stated order, thus charging the electrolytic capacitor CD.

The above-described operations are repeatedly carried out, so that controlled DC voltages are supplied to the electrolytic capacitors CD in a control mode. When this chopper operation starts, the bridge circuit of the transistors QR1 through QR6 of the rectifier circuit 1 perform the inverter operation to convert the DC voltages into three-phase AC voltages, which are applied to the AC generator AG. As a result, the AC generator AG operates as a motor, to start the engine EG. When the speed of the engine EG reaches a predetermined value so that the transistor QI4 stops the chopper operation, while the bridge circuit of the transistors QR1–QR6 stops the inverter operation. Thereafter, the switch SW is turned off. Hence, the inverter transformation circuit 2 starts the inverter transformation operation.

In the above-described embodiment, in starting the engine EG with the AC generator AG as engine starter, the step up chopper circuit is formed by the reactor Lo of the LC filter in the output circuit of the inverter transformation circuit 2, and one transistor QI4 and one diode D2 of the inverter transformation circuit 2, and the battery BATT supplies the control DC voltages to the electrolytic capacitor CD through the step up chopper thus formed. Therefore, the engine-operated generator system of the invention can be formed without the dedicated step up chopper circuit shown in FIG. 8, eliminating the need for transistor QC, reactor LCH, and diode DCH.

In the above described embodiment, one of the electrodes of the battery BATT is equal in potential to one of the buses of the main circuit. Therefore, the control circuit is greatly simplified.

Figure 2:
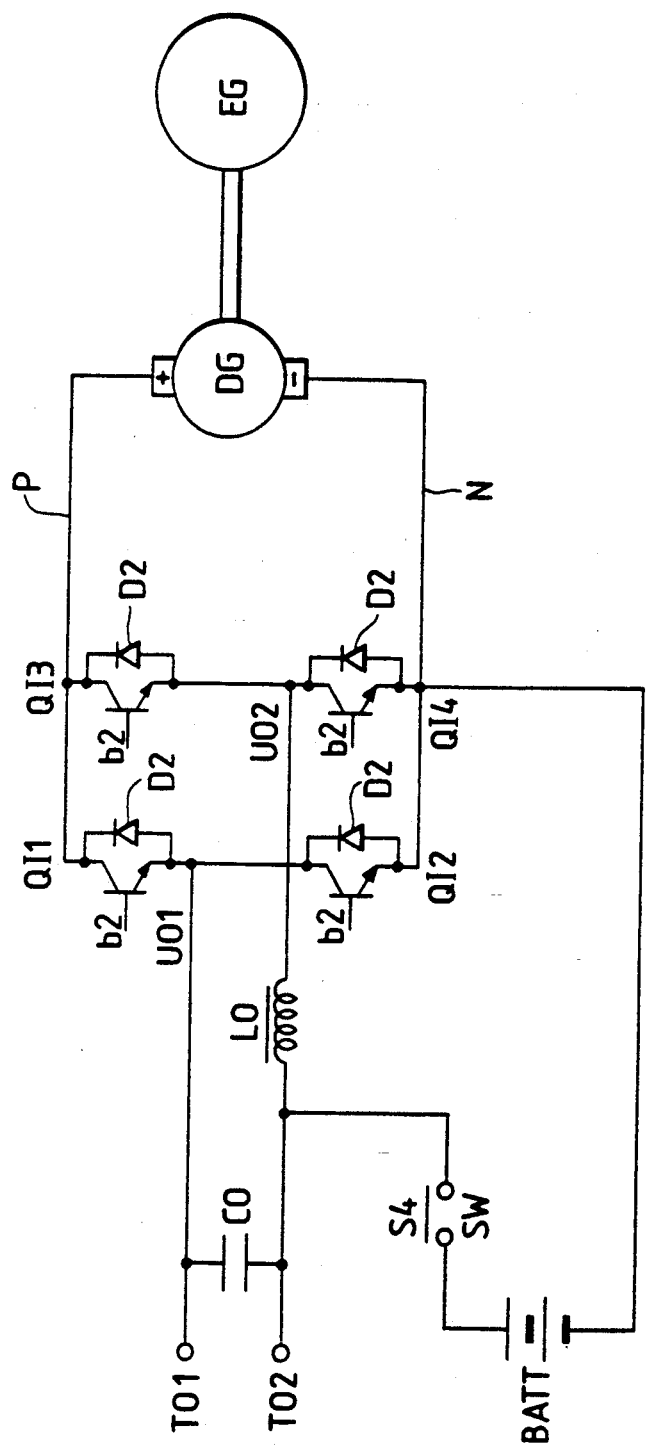
FIG. 2 is a schematic diagram of an engine-operated generator system according to a second preferred embodiment of the invention.
Figure 3:
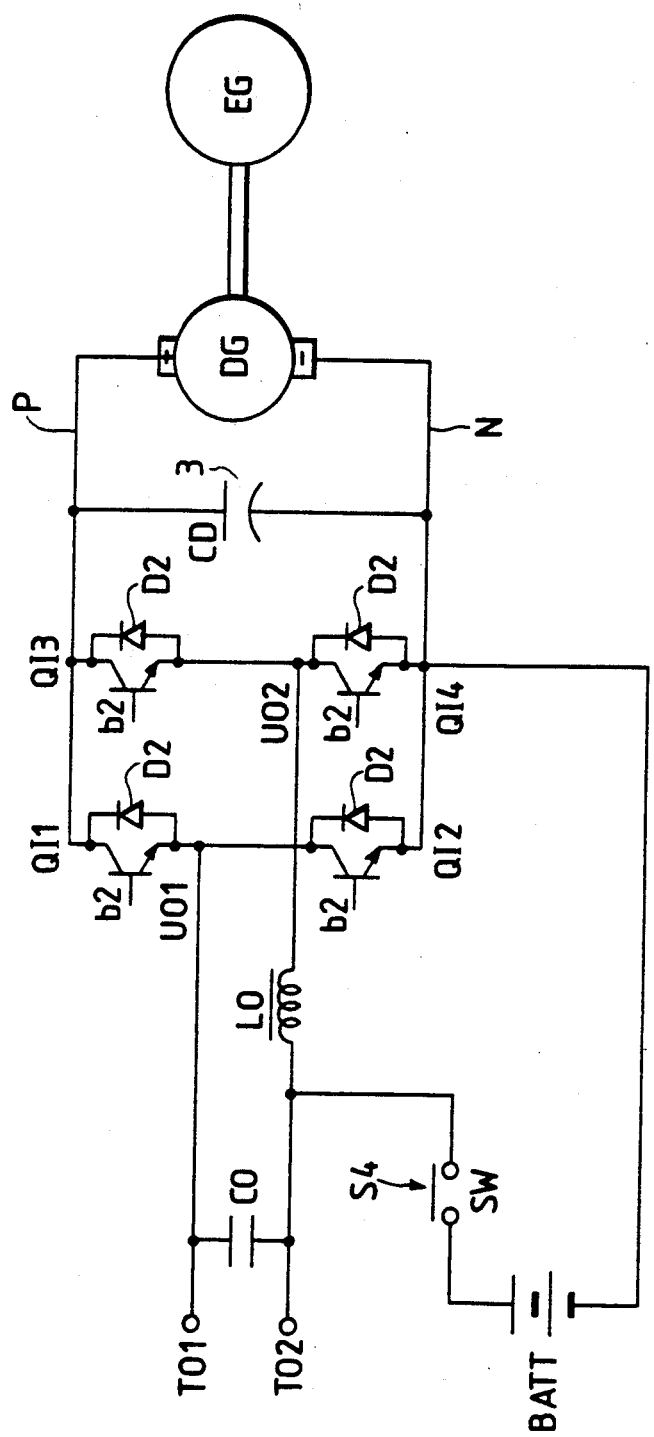
FIG. 3 is a schematic diagram of an engine-operated generator system according to a third preferred embodiment of the invention.

In the above described first embodiment, the engine operated generator system employs the AC generator AG. However, it will be appreciated by those skilled in the art that the invention is not limited thereto or thereby. The technical concept of the invention may be applied, with the same effects, to engine-operated generator systems each employing DC generators DG instead of AC generator AG as shown in FIGS. 2 and 3, which illustrate second and third embodiments of the invention, respectively.

The second and third embodiments are essentially identical to the first embodiment except that DC generator DG is substituted for AC generator AG and, consequently, the bridge circuit of transistors QR1-QR6 are not required. Furthermore, the embodiment shown in FIG. 2 does not include a separate smoothing capacitor, while the embodiment of FIG. 3 does include smoothing capacitor CD connected between the outputs of generator DG.

It will be appreciated by those skilled in the art that, in the above-described embodiments, although the starting DC voltage source is illustrated as the battery BATT, other DC sources may be employed in place of the battery.

Furthermore, in the above-described embodiments, the negative terminal of the battery BATT is connected to the negative terminal of electrolytic capacitor CD. However, it will be appreciated that the invention is not limited thereto or thereby. The same effect can be obtained by connecting the positive terminal of battery BATT to the positive terminal of electrolytic capacitor CD.

Namely, in the engine-operated generator system of the present invention, the starting DC voltage source is connected to the main circuit through the switch which is turned on to start the system, thereby to select the switching element and the diode of the main circuit. The switching element and the diode thus selected, and the reactor, are utilized to supply the starting power from the starting DC voltage source. Hence, it is unnecessary to provide a starting control source circuit is addition to the main circuit. Accordingly, the engine-operated generator system according to the present invention is smaller in the number of components and simpler in circuitry than the conventional engine-operated generator system. In addition, in the system of the present invention, one of the electrodes of the starting DC voltage source may be equal in potential to one of the DC buses of the main circuit, and therefore the control circuit can be simplified in organization, and the manufacturing cost can be reduced as much.

Nevertheless, it will also be appreciated that numerous variations, in addition to those described above, may be made without departing from the principles of the invention, and therefore that the invention should be limited solely by the appended claims.

What is claimed is:

1. An engine-operated generator system, comprising:
an AC generator driven by an engine;
means including a rectifier circuit having an inverter transformation function for rectifying an AC output of said AC generator;
a smoothing capacitor connected between DC terminals of said rectifier circuit;
an inverter transformation circuit whose DC terminals are connected to said smoothing capacitor;
an LC circuit connected to AC terminals of said inverter transformation circuit and to output terminals of said system, one of said output terminals being connected to a reactor of said LC circuit; and
an engine starting DC voltage source having two electrodes,
wherein said inverter transformation circuit is formed by bridge-connected switching elements each having a flywheel diode, wherein one electrode of said engine starting DC voltage source is connected to one terminal of said smoothing capacitor such that said one electrode and said one terminal are of the same polarity, the other electrode of said DC voltage being connected, via a switch which is closed to start said engine, to said one of said output terminals which is connected to said reactor of said LC circuit.

2. An engine-operated generator system, comprising:
an AC generator driven by an engine;
means including a rectifier circuit having an inverter transformation function for rectifying an AC output of said AC generator;
a smoothing capacitor connected between DC terminals of said rectifier circuit;
an inverter transformation circuit whose DC terminals are connected to said smoothing capacitor;
an LC circuit connected to AC terminals of said inverter transformation circuit and to output terminals of said system, one of said output terminals being connected to a reactor of said LC circuit; and
an engine starting DC voltage source having two electrodes,
wherein said inverter transformation circuit is formed by bridge-connected switching elements each having a flywheel diode, wherein one of said switching elements in said inverter transformation circuit is connected between said reactor and one terminal of said smoothing capacitor.

3. An engine-operated generator system, comprising:
a DC generator driven by an engine and having two generator output terminals;
an inverter transformation circuit connected to said two generator output terminals and having two DC terminals;
an LC circuit connected to said DC terminals of said inverter transformation circuit and to system output terminals, one of said system output terminals being connected to a reactor of said LC circuit; and
an engine starting DC voltage source having two electrodes,
wherein said inverter transformation circuit is formed by bridge-connected switching elements each having a flywheel diode, and wherein one electrode of said engine starting DC voltage source is connected to one of said generator output terminals and a second electrode of said DC voltage source is connected, via a switch which is closed to start said engine, to said one of said output terminals which is connected to said reactor of said LC circuit.

4. An engine-operated generator system as claimed in claim 3, wherein one of said switching elements in said inverter transformation circuit is connected between said reactor and one of said terminals of said DC generator.

5. An engine-operated generator system as claimed in claims 3 or 4, wherein a smoothing capacitor is connected between said generator output terminals of said DC generator.

* * * * *